United States Patent
Tsou et al.

(10) Patent No.: US 7,897,663 B2
(45) Date of Patent: Mar. 1, 2011

(54) CLARIFYING AGENT COMPOSITION AND MANUFACTURING METHOD THEREOF

(75) Inventors: Chiu-Peng Tsou, Miao-Li Hsien (TW); Yi-Jung Huang, Miao-Li Hsien (TW); Wen-Chen Wei, Miao-Li Hsien (TW); Ming-Ting Tsai, Miao-Li Hsien (TW); Wen-Chin Chiu, Miao-Li Hsien (TW)

(73) Assignee: Kuo Ching Chemical Co., Ltd., Taoyuan Hsien (TW)

( * ) Notice: Subject to any disclaimer, the term of this patent is extended or adjusted under 35 U.S.C. 154(b) by 531 days.

(21) Appl. No.: 11/976,514

(22) Filed: Oct. 25, 2007

(65) Prior Publication Data

US 2009/0111918 A1   Apr. 30, 2009

(51) Int. Cl.
*C08K 5/06* (2006.01)

(52) U.S. Cl. .................... 524/108; 252/8.91

(58) Field of Classification Search ................ 524/108; 252/8.91
See application file for complete search history.

(56) References Cited

U.S. PATENT DOCUMENTS

| | | | |
|---|---|---|---|
| 4,954,291 A * | 9/1990 | Kobayashi et al. | 252/1 |
| 5,198,484 A * | 3/1993 | Mannion | 524/108 |
| 2007/0060697 A1 * | 3/2007 | Li et al. | 524/493 |

FOREIGN PATENT DOCUMENTS

TW   565562   12/2003

* cited by examiner

*Primary Examiner* — Robert D. Harlan
(74) *Attorney, Agent, or Firm* — Andrews Kurth LLP

(57) ABSTRACT

A clarifying agent composition comprises a diacetal powder and an organosilane treated fume silica having a pH value of 5.5 to 8, measured in a 4% w/w dispersion in 1:1 mixture of water-methanol. The diacetal has the general structure formula (I), (II), (III), (IV) or (V),

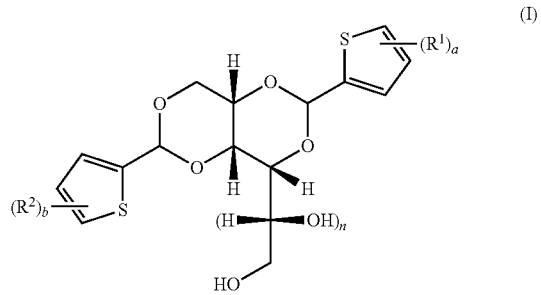

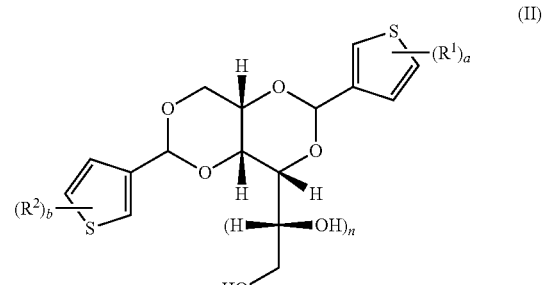

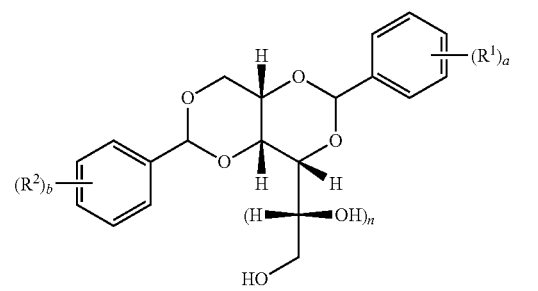

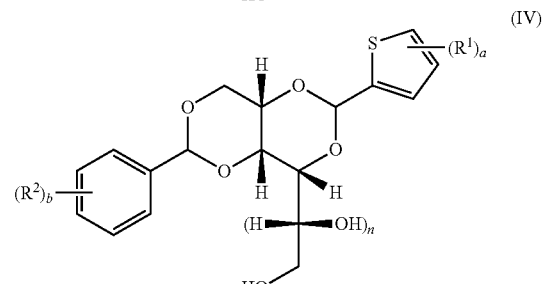

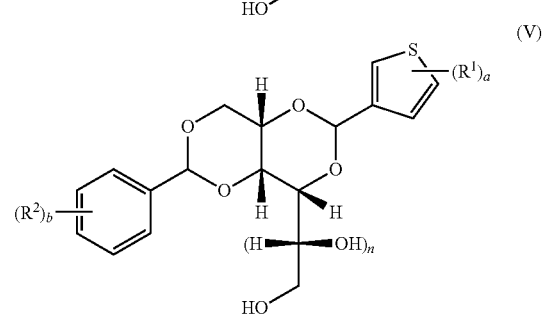

wherein $R^1$ and $R^2$ are independently selected from the group consisting of H, $C_1$-$C_4$ alkyl, $C_1$-$C_4$ carbalkoxy, F, Cl, and Br; a is 0, 1, 2 or 3; b is 0, 1, 2 or 3 and n is 0 or 1. The organosilane treated fume silica is dispersed in the diacetal powder and being 0.05~50% by weight the clarifying agent composition.

This invention also intents to provide a new manufacturing method for preparing superfine powdery diacetal composition with high dispersion characteristic the use of said compositions for preparing polyolefin plastic article without the visible white spots on the surface of the corresponding article.

9 Claims, 12 Drawing Sheets

CLARIFYING AGENT COMPOSITION AND MANUFACTURING METHOD THEREOF

BACKGROUND OF THE INVENTION

1. Field of Invention

The present invention relates to an improved clarifying agent composition comprising an aditol diacetal and 0.05 to 50 parts by weight of an organosilane treated fume silica having a pH value of 5.5 to 8, measured in a 4% w/w dispersion in 1:1 mixture of water-methanol.

This invention also intents to provide a new manufacturing method for preparing superfine powdery diacetal composition with high dispersivity.

Finally, the present invention also relates to use of said compositions for preparing polyolefin plastic article without the visible white spots on the surface of the corresponding article.

2. Description of the Related Art

Diacetal powders can be added to polymeric materials, such as polyolefin, as a nucleating agent for facilitating crystallization, reducing forming period during melting and improving physical properties of polyolefin. Diacetal powders can also be used as clarifying agents to increase transparency of semi-crystalline polymers.

Basically, the mechanism of diacetal powders as clarifying agents is described hereafter. At first, diacetal powders are added to polyolefin and melted at a proper treatment temperature. After polyolefin have cooled down, diacetals crystallize to form a crystallizing network and many spherical nucleation sites in polyolefin. Because the nucleation sites are too small to refract light, the polyolefin thus become transparent. Therefore, keeping small particle size to prevent aggregation of diacetal is known to serve as an important factor to improve polyolefin optical properties.

When the particle size of a diacetal decreases, the amount of pulverizing energy required increases, which generally leads to reduction in productivity and rise in production cost. In addition, it has been pointed out that even when the size of the diacetal is reduced while the pulverizing capability is improved, the fluidity is reduced due to an increase in friction and aggregation of the diacetal particles and an increase in the ratio of water adhering to the surface of the diacetal particles under high humidity conditions.

When particle size of the diacetal powders added to polyolefin are too large or aggregated intensively, the polyolefin often show visible white spots. These white spots may lead to rejection (or disqualification) of a finished plastic article. Therefore, removal of the visible white spots in polyolefin is an important issue in the art.

U.S. Pat. No. 5,198,484 Patent (Mannion) described a conventional method for removing the white spots in polyolefin by adding polar aliphatic additives to polyolefin for dispersing diacetal powders. However, the polar aliphatic additives may migrate to the surface of the polyolefin which causes blooming. Another conventional method is to raise the treatment temperature 3 to 10° C. higher than the melting point of the diacetals. However, the melting points of the diacetals are usually 50~100° C. higher than the melting points of the polyolefin, causing the polyolefin to degrade and may form yellowed and olfactory products.

U.S. Pat. No. 4,954,291 Patent (Kabayashi et al.) disclosed a mixed diacetal composition comprising acetal and triacetal by-products and having a lower melting point. Unfortunately, the mixed diacetal composition has limited use as a clarifying agent.

Another conventional method for manufacturing diacetal disclosed in Taiwan Patent No. 565562 (Scrivens et al.) also incurs problems with acetal by-product and triacetal by-product which is difficult to remove from the desired diacetal. This method is also complicated and offers limited control on the particle size of the diacetal which makes the dispersion of diacetal in the polyolefin difficult.

There is a common industrial approach involving pre-blending a powdery compound and a flowing aid to improve the flow properties. Although various types of such fine powder of an inorganic compound are applicable, the use of fine powder of silicone dioxide (silica) has been generally suggested.

U.S. Pat. Application No. 2007-0060697 (Li et al.) described the use of pre-blending a commercial sorbitol acetal compound and a hydrophobic silica for improving the flow properties. Li et al. selected some commercial grades samples of silica from Aerosil® product line "R" series and Sipernat® product lines "D" series from Degussa AG and Cab-o-Sil® product line "TG" series and Nanogel® product line from Cabot. Include Aerosil® R972 and HDK® H15.

Commercially, a hydrophobic treatment of silica has been performed through the use of volatile silanes in a reactor heated at about 400° C. For example, a method to utilize the thermal decomposition oxidizing reaction in an oxyhydrogen flame of silicon tetrachloride gas has been used, wherein the following reaction occurs:

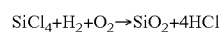

$SiCl_4 + H_2 + O_2 \rightarrow SiO_2 + 4HCl$

Because it is not very easy to remove hydrogen chloride generated during this reaction, the resulting pH value of the hydrophobic silica thus decreases to 3 to 4. Specifically, the conventional organosilane treated fume silica obtained in the past had various problems such as the pH value and the amount to be added.

Li et al. disclosed a method involving pre-blending an acetal and a hydrophobic silica having low pH value. However, Li et al. did not mention that acidic condition of the hydrophobic silica probably causes the said acetal decay at the polymer processing temperature. Furthermore, it is easy to get the information from the supplier web site that hydrophobic silica Aeosil® R972 has a pH value of 4.2 and HDK® H15 has a pH value of 3.8~4.8, measured in a 4% w/w dispersion in 1:1 mixture of water-methanol.

Hence, there is a need to provide a simple, low-cost method for preparing clarifying agent composition with small particle size and non-aggregation property that will not decay at the polymer processing temperature. This invention provides an improved superfine powdery clarifying agent composition and manufacturing method thereof to mitigate or obviate the aforementioned problems and is further described below.

SUMMARY OF THE INVENTION

The primary objective of the present invention is to provide a clarifying agent composition that will not cause the visible white spots in polyolefin.

A clarifying agent composition in accordance with the present invention comprising an aditol diacetal and 0.05 to 50 parts by weight of an organosilane treated fume silica having a pH value of 5.5 to 8, measured in a 4% w/w dispersion in 1:1 mixture of water-methanol.

The diacetal has the general structure formula (I), (II), (III), (IV) or (V):

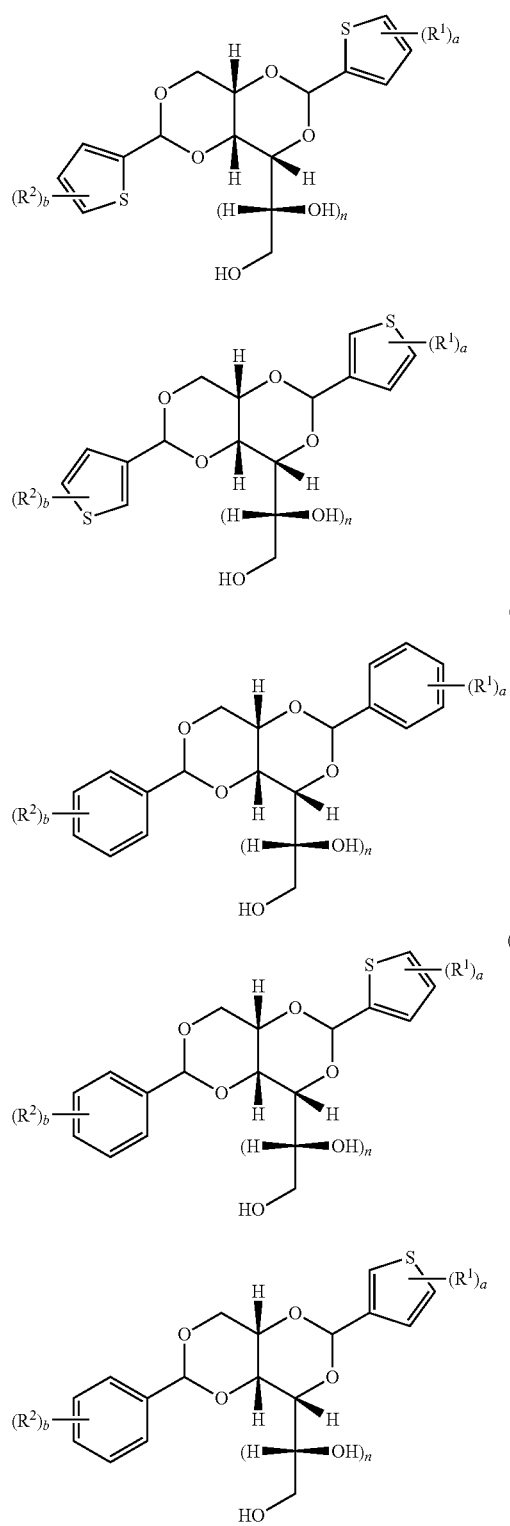

wherein $R^1$ and $R^2$ are independently selected from the group consisting of H, $C_1$-$C_4$ alkyl, $C_1$-$C_4$ carbalkoxy, F, Cl, and Br; a is 0, 1, 2 or 3; b is 0, 1, 2 or 3 and n is 0 or 1.

The clarifying agent in accordance with the present invention is excellent as a nucleating and clarifying additive for polyolefin plastic compositions.

The invention also relates a polyolefin composition characterized in that the clarifying agent composition in accordance with the invention is added during the polymerization of the polyolefin.

The amount of the clarifying agent composition to be incorporated in the polyolefin composition of this invention is from about 0.005 to about 2% by weight, preferably from about 0.05 to 0.5% by weight, especially preferred from about 0.1 to 0.3% by weight, based on the weight of the polyolefin composition.

The invention also relates a transparent polyolefin plastic article comprising the polyolefin composition in accordance with the invention.

The term "polyolefin plastic article" used herein refers to crystalline or semi-crystalline polyolefin products containing the additives disclosing in the present invention, as merely examples, for food or cosmetic containers or packing.

Preferably, the diacetal is 1,3:2,4-di(3-thenylidene)-D-sorbitol, 1,3:2,4-di(5-methyl-2-thenylidene)-D-sorbitol, 1,3:2,4-di(4-methyl-benzylidene)-D-sorbitol, 1,3:2,4-di(3,4-dimethyl-benzylidene)-D-sorbitol, 1,3-(3-thenylidene)-2,4-(4-methyl-benzylidene)-D-sorbitol, 1,3-(3-thenylidene)-2,4-(3,4-dimethyl-benzylidene)-D-sorbitol, 1,3-(5-methyl-2-thenylidene)-2,4-(4-methyl-benzylidene)-D-sorbitol or 1,3-(5-methyl-2-thenylidene)-2,4-(3,4-dimethyl-benzylidene)-D-sorbitol benzylidene)-D-sorbitol.

Preferably, the organosilane treated fume silica powder is 2~10% by weight of the clarifying agent composition. The organosilane treated fume silica used in the present invention having a pH value of 5.5 to 8, measured in a 4% w/w dispersion in 1:1 mixture of water-methanol.

In the conventional type fume silica treated with a silicon halogen compound such as dimethylchlorosilane, methyltrichlorosilane and trimethylchlorosilane, hydrogen chloride is generated during the reaction and it remains about 0.05% without being completely removed. Thus, it has a low pH value. However, in case of fume silica treated with hexamethyldisilazane, trimethylchlorosilane or polydimethylsiloxane in the present invention, hydrogen chloride is not generated and the low pH value problem does not occur. While treating with hexamethyldisilazane, ammonia is generated in the reaction and the resulting organosilane treated fume silica thus shows a higher pH value due to the alkalinity of ammonia itself.

The organosilane treated fume silica having such property can be easily produced by those skilled in the art by means of the above method. As the commercially available product, H-2000 by Wacker Chemicals East Asia Limited (hexamethyldisilazane treated fume silica, pH value of 6.7 to 7.7, measured in a 4% w/w dispersion in 1:1 mixture of water-methanol, having surface area 140±30 $m^2$/g), TS-720 by Cabot Corporation (dimethylsilicon treated fume silica, pH value of 5.8, measured in a 4% w/w dispersion in 1:1 mixture of water-methanol, having surface area 105 to 130 $m^2$/g), and TS-530 by Cabot Corporation (hexamethyldisilazane treated fume silica, pH value of 6.0, measured in a 4% w/w dispersion in 1:1 mixture of water-methanol, having surface area 205 to 245 $m^2$/g) can be used.

The polyolefin plastic compositions based on crystalline and semi-crystalline polyolefin polymers or polyolefin resin compositions consisting essentially of at least one homopolymer of an aliphatic mono-olefin or a copolymer of a $C_2$-$C_8$ alpha-mono-olefin, particularly propylene polymer material and mixtures of such polyolefin polymers (e.g., polypropylene). Well-known commercial crystalline polypropylene products are normally solid, predominantly isotactic, semi-crystalline, thermoplastic homopolymer formed by the polymerization of propylene. As used herein, semi-crystalline means a crystallinity of at least about 5-10% as measured by X-ray diffraction.

The clarifying agent composition of the present invention is prepared by mixing aromatic aldehyde, polyol, acid catalyst in a polar solvent to perform a condensation reaction and form a reaction mixture, adding a organosilane treated fume silica having a pH value of 5.5 to 8, measured in a 4% w/w dispersion in 1:1 mixture of water-methanol, to the reaction mixture, which is filtered, dried and ground to form the clarifying agent composition. The equivalent ratio of aromatic aldehyde to polyol is 2:1~2:2 (2:1.05~2:1.3 is preferred) in the polar solvent.

The aromatic aldehyde can be thiophenecarboxaldehyde or benzaldehyde, can be unsubstituted or has 1, 2 or 3 substituents selected from the group consisting of $C_1$-$C_4$ alkyl, $C_1$-$C_4$ alkoxy, $C_1$-$C_4$ carbalkoxy, F, Cl, and Br. The aromatic aldehyde can also be a mixture of thiophenecarboxaldehyde and benzaldehyde.

Preferably, the thiophenecarboxaldehyde can be 3-thiophenecarboxaldehyde or 5-methyl-2-thiophenecarboxaldehyde.

Preferably, the benzaldehyde can be 4-methyl-benzaldehyde or 3,4-dimethyl-benzaldehyde.

The polyol as defined herein is a group of alcohols containing more than one alcohol group and may be commonly referred to as sugar alcohols in food chemistry and can be sorbitol or xylitol. Preferably, the polyol is D-sorbitol.

The acid catalyst used in the reaction can be sulfuric acid, phosphoric acid, hydrochloric acid, methanesulfonic acid, camphorsulfonic acid, p-toluenesulfonic acid, naphthalenesulfonic acid, or the like.

The polar solvent used in the reaction can be methanol, ethanol, dimethyl formamide (DMF) or acetonitrile.

The condensation reaction can be carried out at various temperatures. In the case of 3-thiophenecarboxaldehyde, for instance, it has been determined that such reaction may be desirably carried out at ambient or room temperatures.

The organosilane treated fume silica used in the present invention having a pH value of 5.5 to 8, measured in a 4% w/w dispersion in 1:1 mixture of water-methanol is added to the reaction mixture. Surprisingly, the clarifying agent composition prepared becomes an extra fine powder with high fluidity after drying and will not aggregate. When the clarifying agent composition is added to polyolefin, the clarifying agent composition will facilitate nucleation of the polyolefin and lower the haze of the polyolefin. In addition, the resulting polyolefin surface will not show visible white spots.

Other objectives, advantages and novel features of the invention will become more apparent from the following detailed description when taken in conjunction with the accompanying drawings.

DETAILED DESCRIPTION OF THE INVENTION

A clarifying agent composition in accordance with the present invention comprises an aditol diacetal powder and an organosilane treated fume silica has a pH value of 5.5 to 8, measured in a 4% w/w dispersion in 1:1 mixture of water-methanol. The diacetal has the general structure formula (I), (II), (III), (IV) or (V):

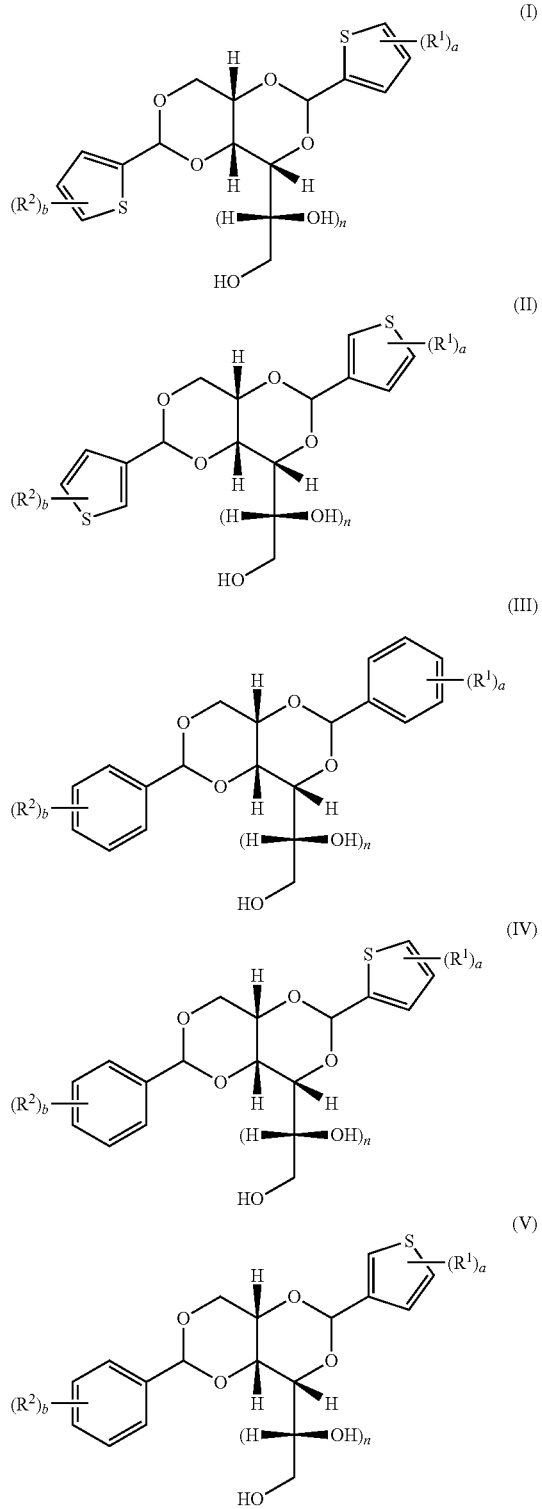

wherein $R^1$ and $R^2$ are independently selected from the group consisting of H, $C_1$-$C_4$ alkyl, $C_1$-$C_4$ carbalkoxy, F, Cl, and Br; a is 0, 1, 2 or 3; b is 0, 1, 2 or 3 and n is 0 or 1. The organosilane treated fume silica used in the present invention has a pH value of 5.5 to 8, measured in a 4% w/w dispersion in 1:1 mixture of water-methanol, is 0.05~50% by weight of the clarifying agent composition.

The clarifying agent composition manufacturing method comprises the steps of:

mixing aromatic aldehyde, polyol and acid catalyst in a polar solvent to perform a condensation reaction and form a reaction mixture, wherein the equivalent ratio of aromatic aldehyde to polyol is 2:1~2:2 in the polar solvent; and adding an organosilane treated fume silica having a pH value of 5.5 to 8, measured in a 4% w/w dispersion in 1:1 mixture of water-methanol, to the reaction mixture, which is filtered, dried and ground to form the clarifying agent composition, wherein organosilane treated fume silica is 0.05~50% by weight of the clarifying agent composition.

The following examples further illustrates the present invention but are not to be construed as limiting the invention as defined in the claims appended hereto. All parts and percents given in these examples are by weight unless otherwise indicated.

EXAMPLE 1

Preparation of 1,3:2,4-di(3-thenylidene)-D-sorbitol

Figure 1:
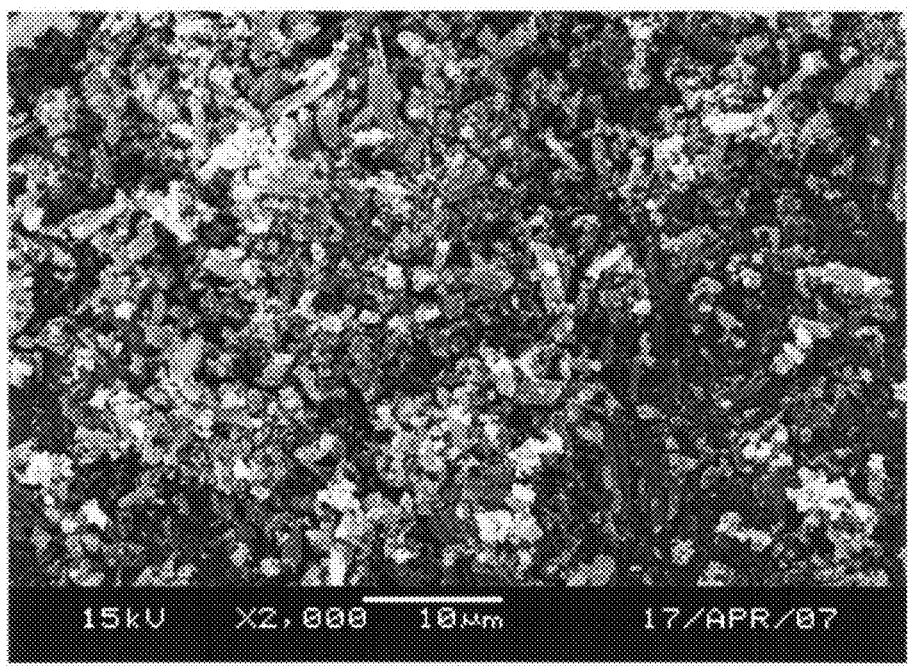
FIG. 1 is an electron microscope photo of a product of Example 1 in accordance with the present invention at magnification of 2000×.
Figure 2:
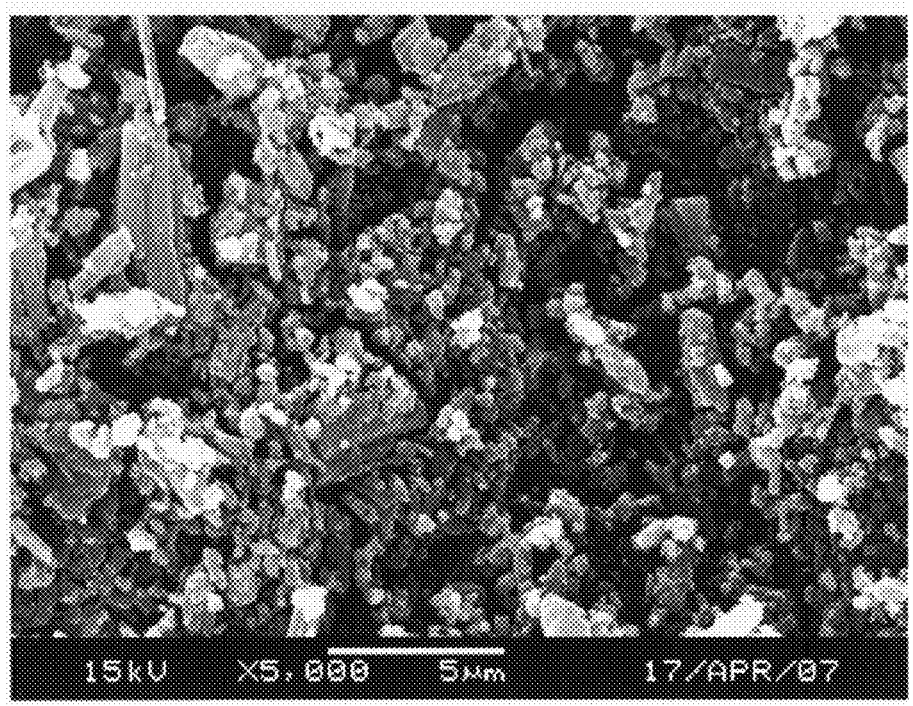
FIG. 2 is an electron microscope photo of the product in FIG. 1 at magnification of 5000×.

A 1 litter four-necked cylindrical shaped reaction flask equipped with a thermometer, nitrogen inlet, and a mechanical stirrer was charged with D-sorbitol (20.0 g, 0.110 mole), methanesulfonic acid (1.00 g), 3-thiophenecarboxaldehyde (25.0 g, 0.223 mole) and methanol (200 ml) to form a reaction mixture. The reaction mixture was stirred at room temperature for 48 hours, neutralized to pH 8~9 with a solution of 4% sodium hydroxide (NaOH) aqueous to form a precipitated product. The precipitated product was collected by filtration, washed with a solution of 40% methanol aqueous, dried and ground to give 1,3:2,4-di(3-thenylidene)-D-sorbitol as a fine white powder (29.2 g, yield 72%) having the following characteristics: a melting point of 237.0~239.8° C.; $^1$H NMR (500 MHz, $d_6$-DMSO) δ 7.49~7.48 (m, 4H), 7.13~7.08 (m, 2H), 5.68 (s, 2H), 4.81 (d, 1H, J=7.0 Hz), 4.38 (m, 1H), 4.13~4.09 (m, 3H), 3.89 (s, 1H), 3.81~3.71 (m, 2H), 3.63~3.57 (m, 1H), 3.48~3.39 (m, 1H). The prepared powder was observed with an electron microscope at magnifications of 2000× and 5000× as shown in FIGS. 1 and 2.

EXAMPLE 2

Figure 3:
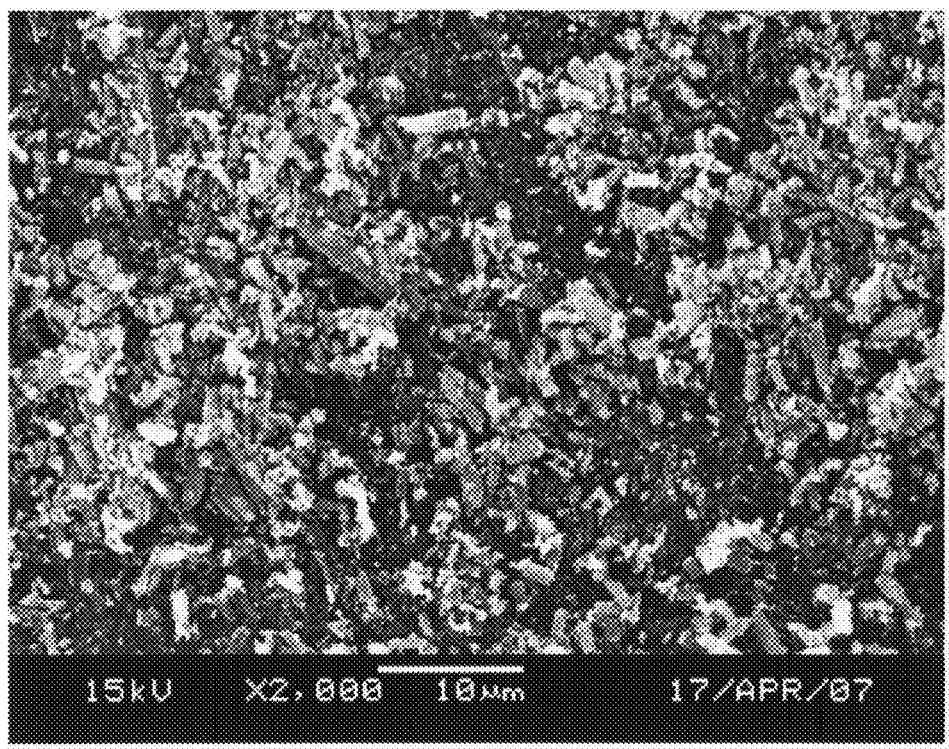
FIG. 3 is an electron microscope photo of a product of Example 2 in accordance with the present invention at magnification of 2000×.
Figure 4:
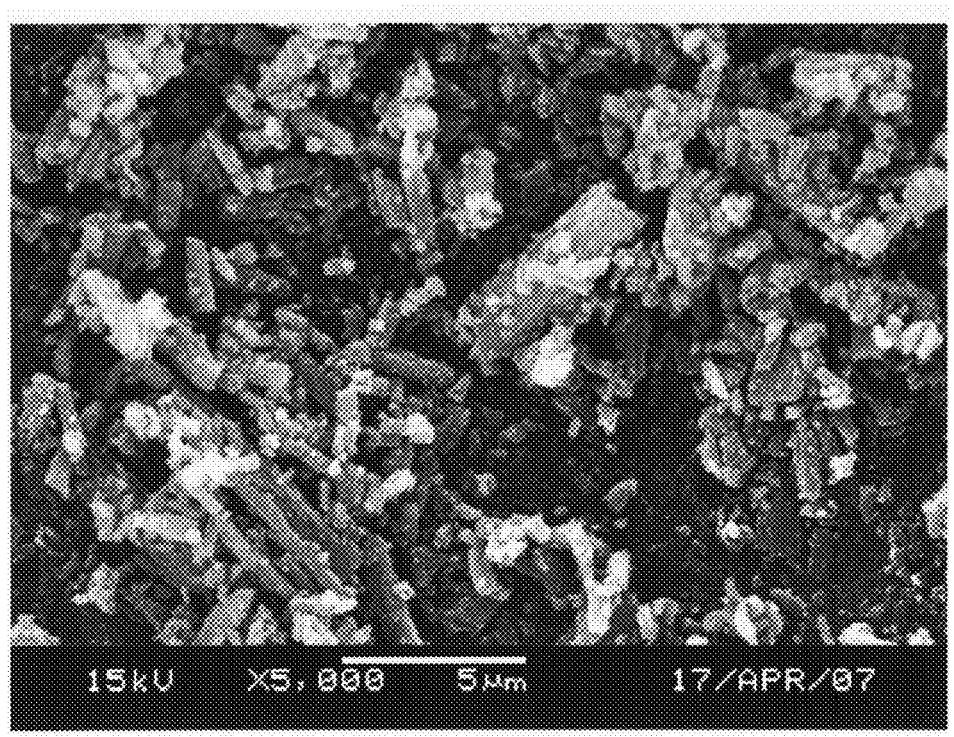
FIG. 4 is an electron microscope photo of the product in FIG. 3 at magnification of 5000×.

Preparation of a Clarifying Agent Composition Containing 1,3:2,4-di(3-thenylidene)-D-sorbitol and an Organosilane Treated Fume Silica 1,3:2,4-di(3-thenylidene)-D-sorbitol was prepared like EXAMPLE 1 to form a precipitated product and an organosilane treated fume silica (3.0 g, CAB-O-SIL® TS720) was added to the precipitated product to form a mixture. The mixture is dried and ground to give a white powder (33.5 g) of high fluidity having the following characteristics: a melting point of 237.2~240.1° C., an ash content of 8.1%. The prepared powder was observed with an electron microscope at magnifications of 2000× and 5000× as shown in FIGS. 3 and 4.

EXAMPLE 3

Preparation of
1,3:2,4-di(5-methyl-2-thenylidene)-D-sorbitol

Figure 5:
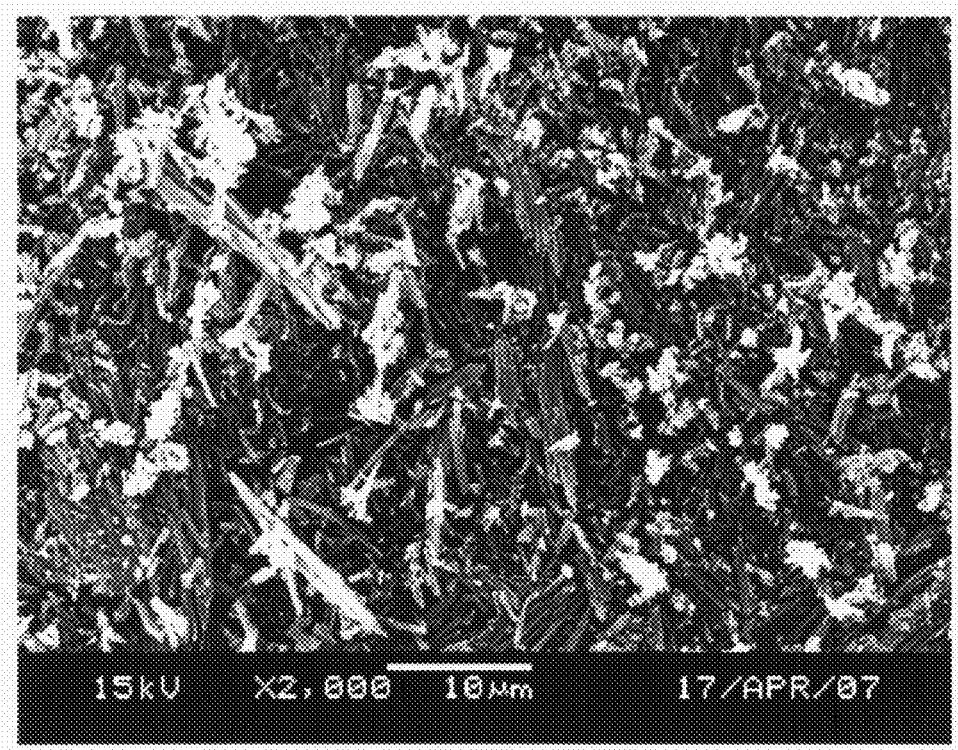
FIG. 5 is an electron microscope photo of a product of Example 3 in accordance with the present invention at magnification of 2000×.
Figure 6:
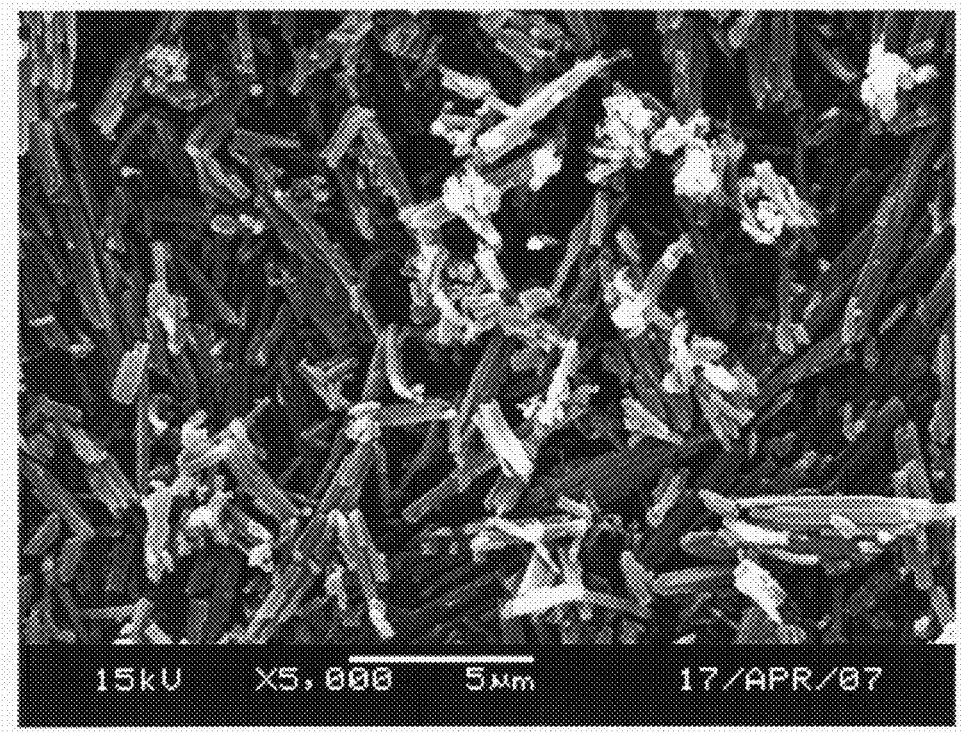
FIG. 6 is an electron microscope photo of the product in FIG. 5 at magnification of 5000×.

A 1 litter four-necked cylindrical shaped reaction flask equipped with a thermometer, nitrogen inlet, and a mechanical stirrer was charged with D-sorbitol (20.0 g, 0.110 mole), methanesulfonic acid (1.00 g), 5-methyl-2-thiophenecarboxaldehyde (25.0 g, 0.198 mole) and methanol (200 ml) to form a reaction mixture. The reaction mixture was stirred at room temperature for 48 hours, neutralized to pH 8~9 with a solution of 4% sodium hydroxide (NaOH) aqueous to form a precipitated product. The precipitated product was collected by filtration, washed with a solution of 40% methanol aqueous, dried and ground to give 1,3:2,4-di(5-methyl-2-thenylidene)-D-sorbitol as a fine white powder (27.3 g, yield 69.2%) having the following characteristics: a melting point of 209.5~210.4° C., an ash content of 0.07%; $^1$H NMR (500 Hz, $d_6$-DMSO) δ 6.90~6.87 (m, 4H), 6.68~6.67 (m, 2H), 5.78 (s, 2H), 4.73 (d, 1H, J=5.8 Hz), 4.35 (t, 1H, J=5.8 Hz), 4.11 (dd, 1H, J=12.6, 1.8 Hz), 4.06~4.02 (s+dd, 2H), 3.87 (d, 1H, J=1.3 Hz), 3.77 (dd, 1H, J=7.3, 1.6 Hz), 3.70~3.67 (m, 1H), 3.62~3.54 (m, 1H), 3.40~3.34 (m, 1H), 2.41 (s, 6H). The prepared powder was observed with an electron microscope at magnifications of 2000× and 5000× as shown in FIGS. 5 and 6.

EXAMPLE 4

Figure 7:
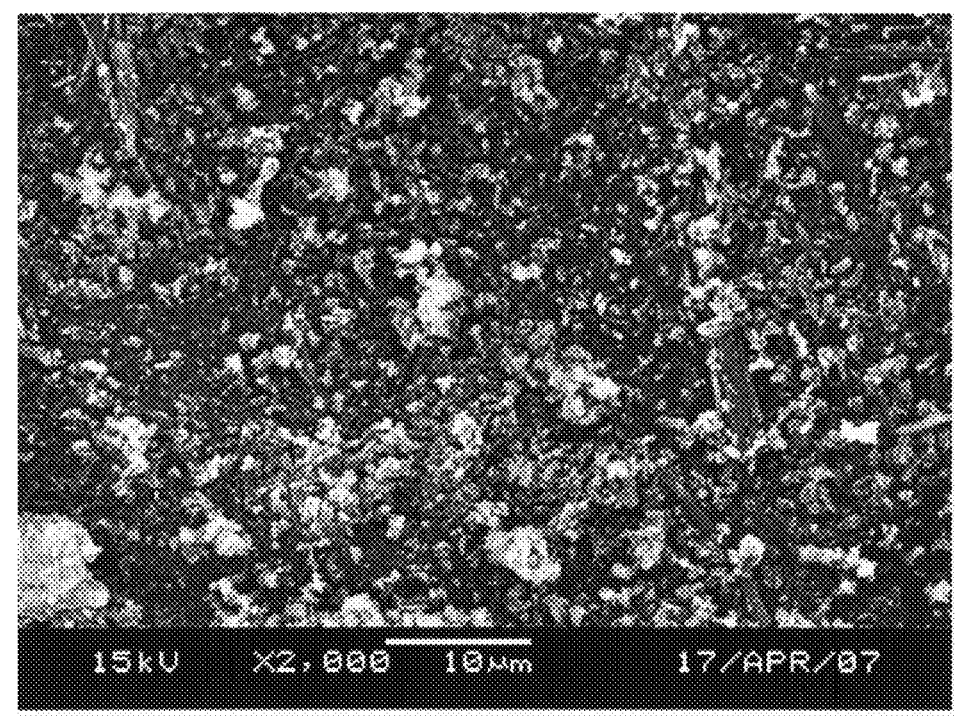
FIG. 7 is an electron microscope photo of a product of Example 4 in accordance with the present invention at magnification of 2000×.
Figure 8:
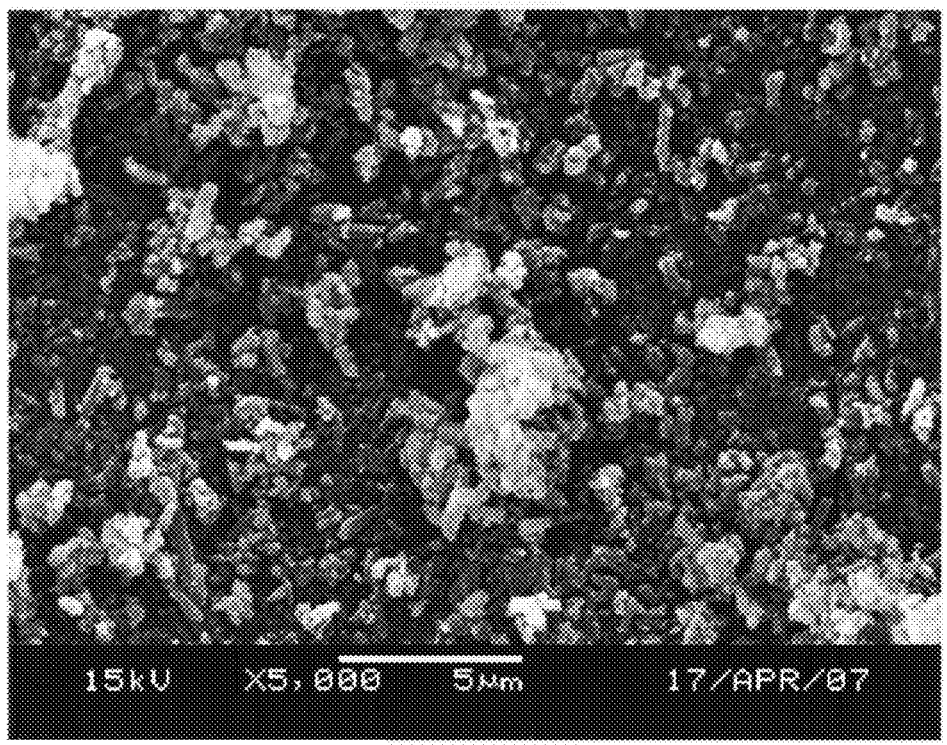
FIG. 8 is an electron microscope photo of the product in FIG. 7 at magnification of 5000×.

Preparation of a Clarifying Agent Composition
Containing
1,3:2,4-di(5-methyl-2-thenylidene)-D-sorbitol and an
Organosilane Treated Fume Silica 1,3:2,4-di(5-methyl-2-thenylidene)-D-sorbitol was prepared like EXAMPLE 3 to form a precipitated product and an organosilane treated fume silica (3.0 g, CAB-O-SIL® TS720) was added to the precipitated product to form a mixture. The mixture is dried and ground to give a white powder (31.3 g) having the following characteristics: a melting point of 209.1~210.3° C. and an ash content of 8.7%. The prepared powder was observed with an electron microscope at magnifications of 2000× and 5000× as shown in FIGS. 7 and 8.

EXAMPLE 5

Preparation of 1,3:2,4-di(3-thenylidene)-D-xylitol

A 1 litter four-necked cylindrical shaped reaction flask equipped with a thermometer, nitrogen inlet, and a mechanical stirrer was charged with D-xylitol (10.0 g, 0.066 mole), camphorsulfonic acid (0.5 g), 3-thiophenecarboxaldehyde (14.8 g, 0.132 mole) and methanol (100 ml) to form a reaction mixture. The reaction mixture was stirred at room temperature for 48 hours, neutralized to pH 8~9 with a solution of 4% sodium hydroxide (NaOH) aqueous to form a precipitated product. The precipitated product was collected by filtration, washed with a solution of 40% methanol aqueous, dried and ground to give 1,3:2,4-di(3-thenylidene)-D-xylitol as a fine white powder (16.0 g, yield 71%) having the following characteristics: a melting point of 209.5~210.4° C.; $^1$H NMR (500 Hz, $d_6$-DMSO) δ 7.53~7.49 (m, 4H), 7.13~7.08 (m, 2H), 5.73 (s, 1H), 5.66 (s, 1H), 4.87~4.70 (bs, 1H), 4.13~4.07 (dd, 2H, J=12.6, 8.5 Hz), 4.08 (s, 1H), 4.07~3.94 (m, 1H), 3.88 (d, 1H, J=1.2 Hz).

EXAMPLE 6

Preparation of Modified
1,3:2,4-di(4-methyl-benzylidene)-D-sorbitol

Figure 9:
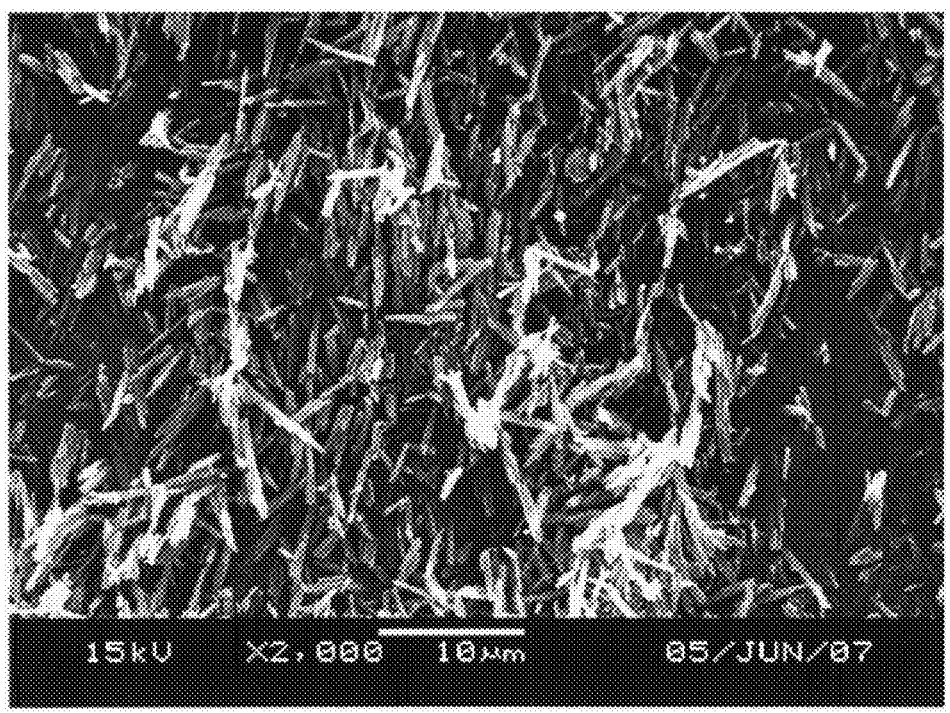
FIG. 9 is an electron microscope photo of a product of Example 6 in accordance with the present invention at magnification of 2000×.
Figure 10:
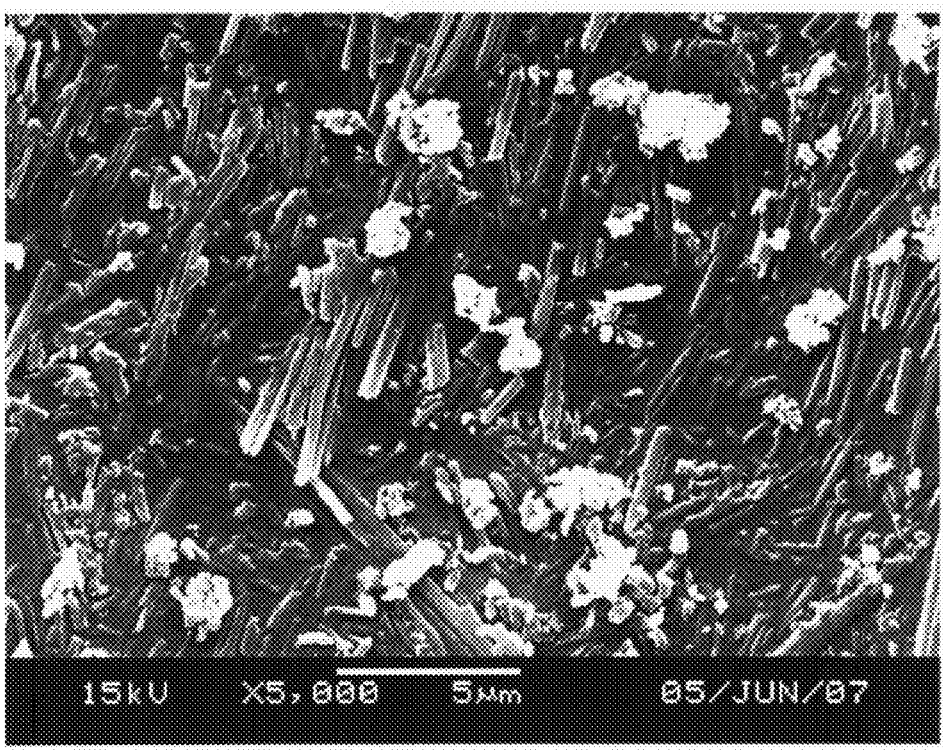
FIG. 10 is an electron microscope photo of the product in FIG. 9 at magnification of 5000×.

A 1000 litter stainless steel reactor equipped with a mechanical stirrer and a circulating temperature-controlling jacket was charged with D-sorbitol (40.0 kg, 0.220 kmole), camphorsulfonic acid (1.2 kg), 4-methyl-benzaldehyde (47.5 kg, 0.395 kmole), 3-thiophenecarboxaldehyde (0.220 kg, 0.002 kmole) and methanol (450 kg) to form a reaction mixture. The reaction mixture was stirred at a temperature range of 20~35° C. for 48 hours, neutralized to pH 8~9 with a solution of 4% sodium hydroxide (NaOH) aqueous to form a precipitated product. The precipitated product was collected by filtration, washed with a solution of 40% methanol aqueous, dried with a paddle drying equipment and ground to give modified 1,3:2,4-di(4-methyl-benzylidene)-D-sorbitol as a fine white powder (67.2 kg, yield 88%), having the following characteristics: a melting point of 257.9° C., a crystallization point of 240.4° C., an ash content 0.13%. The prepared powder was observed with an electron microscope at magnifications of 2000× and 5000× as shown in FIGS. 9 and 10.

EXAMPLE 7

Figure 11:
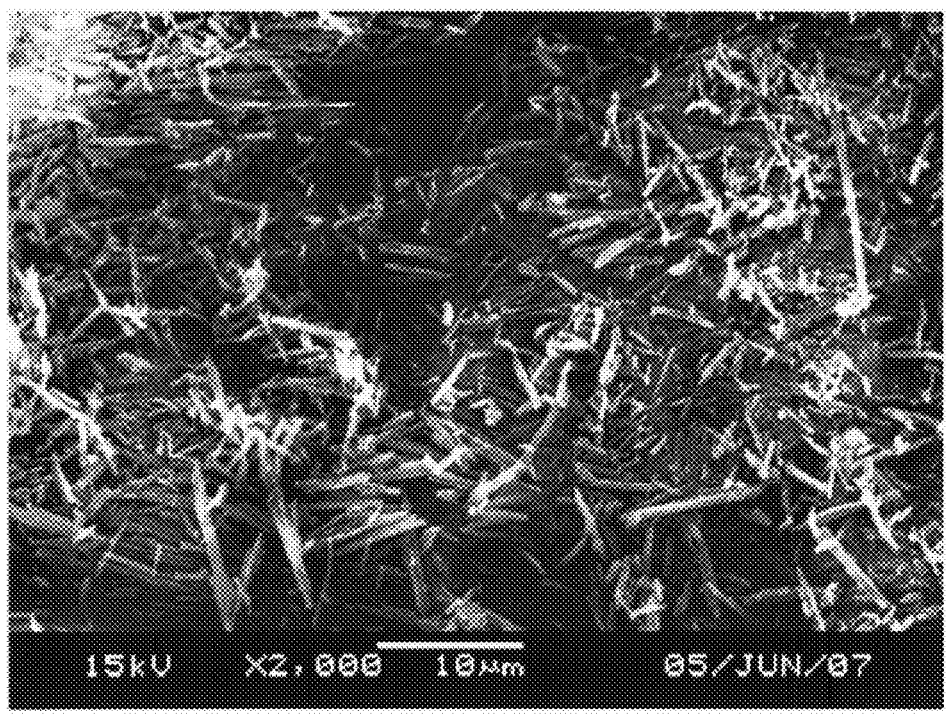
FIG. 11 is an electron microscope photo of a product of Example 7 in accordance with the present invention at magnification of 2000×.
Figure 12:
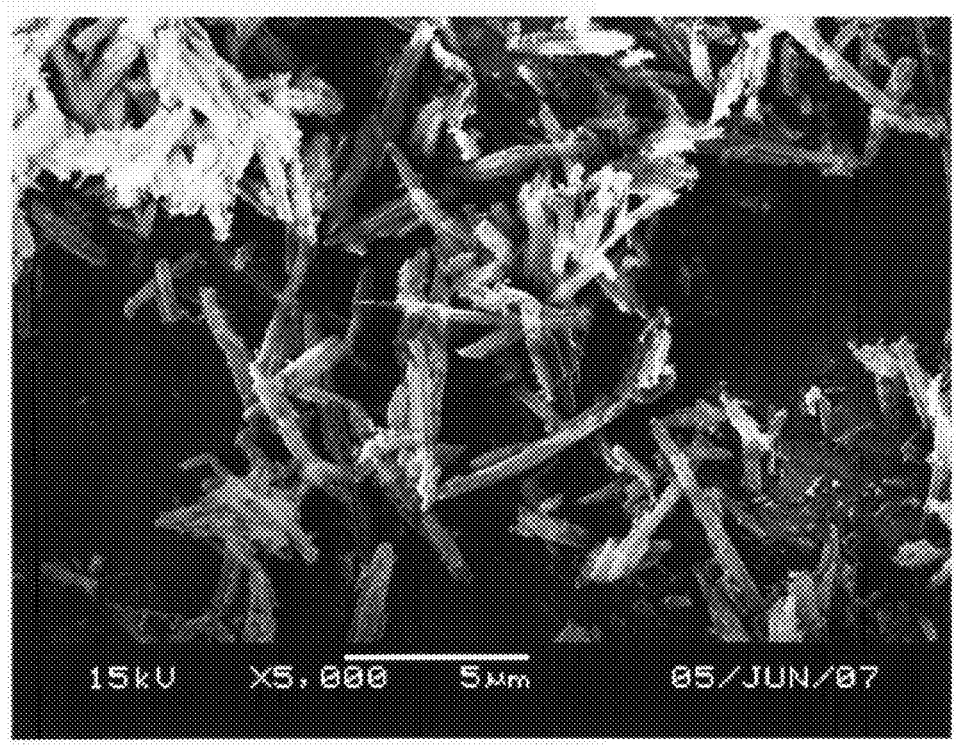
FIG. 12 is an electron microscope photo of the product in FIG. 11 at magnification of 5000×.

Preparation of a Clarifying Agent composition
Containing Modified
1,3:2,4-di(4-methyl-benzylidene)-D-sorbitol and an
Organosilane Treated Fume Silica Modified 1,3:2,4-di(4-methyl-benzylidene)-D-sorbitol was prepared like EXAMPLE 6 to form a reaction mixture and an organosilane treated fume silica (3.0 kg, CAB-O-SIL® TS720) was added to the reaction mixture to form the precipitated product after the reaction mixture was neutralized to pH 8~9. The precipitated product was collected by filtration, washed with a solution of 40% methanol aqueous, dried and ground to give the composition (69.1 kg) having the following characteristics: a melting point of 251.2° C., a crystallization point of 218.4° C., an ash content of 3.2%. The prepared powder was observed with an electron microscope at magnifications of 2000× and 5000× as shown in FIGS. 11 and 12.

EXAMPLE 8

Figure 13:
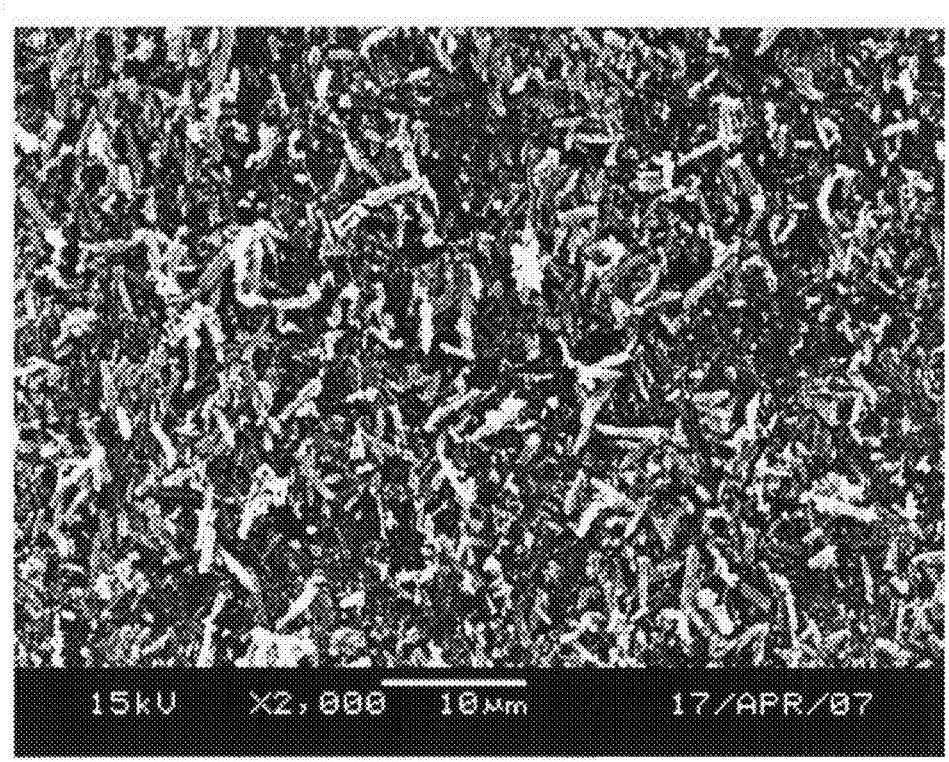
FIG. 13 is an electron microscope photo of a product of Example 8 in accordance with the present invention at magnification of 2000×.
Figure 14:
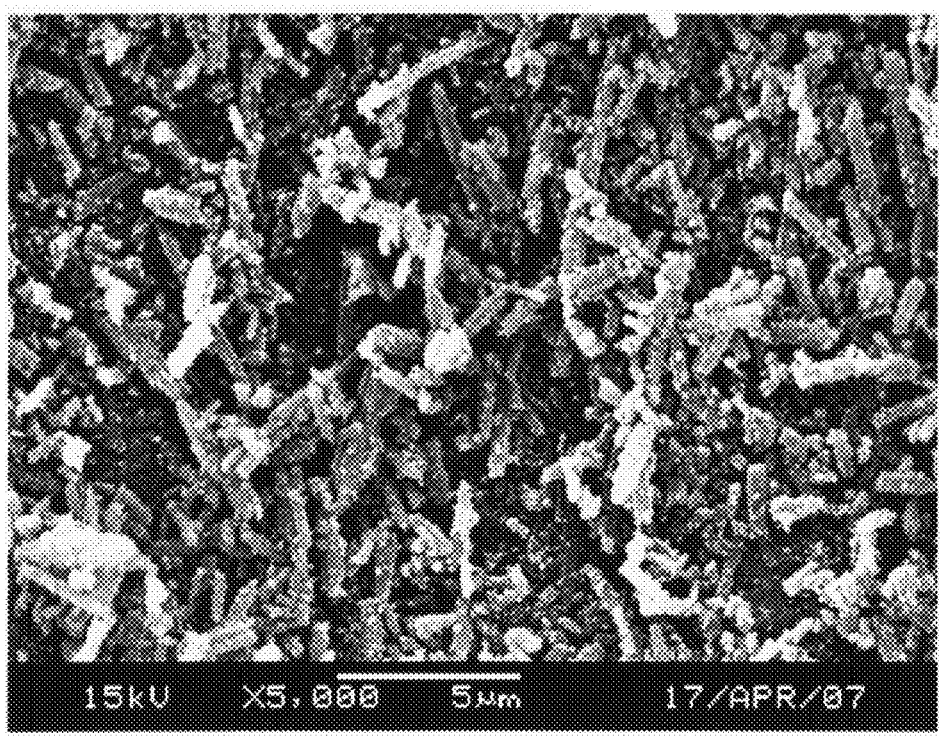
FIG. 14 is an electron microscope photo of the product in FIG. 13 at magnification of 5000×.

Preparation of a Clarifying Agent Composition
Containing Modified
1,3:2,4-di(4-methyl-benzylidene)-D-sorbitol and an
Organosilane Treated Fume Silica Modified 1,3:2,4-di(4-methyl-benzylidene)-D-sorbitol was prepared like EXAMPLE 6 to form a reaction product and an organosilane treated fume silica (7.5 kg, CAB-O-SIL® TS720) was added to the reaction mixture to form the precipitated product after the reaction mixture was neutralized to pH 8~9. The precipitated product was collected by filtration, washed with a solution of 40% methanol aqueous, dried and ground to give the composition (66.5 kg) having an ash content of 9.8%. The prepared powder was observed with an electron microscope at magnifications of 2000× and 5000× as shown in FIGS. 13 and 14.

EXAMPLE 9

Preparation of Modified
1,3:2,4-di(3,4-dimethyl-benzylidene)-D-sorbitol

Figure 15:
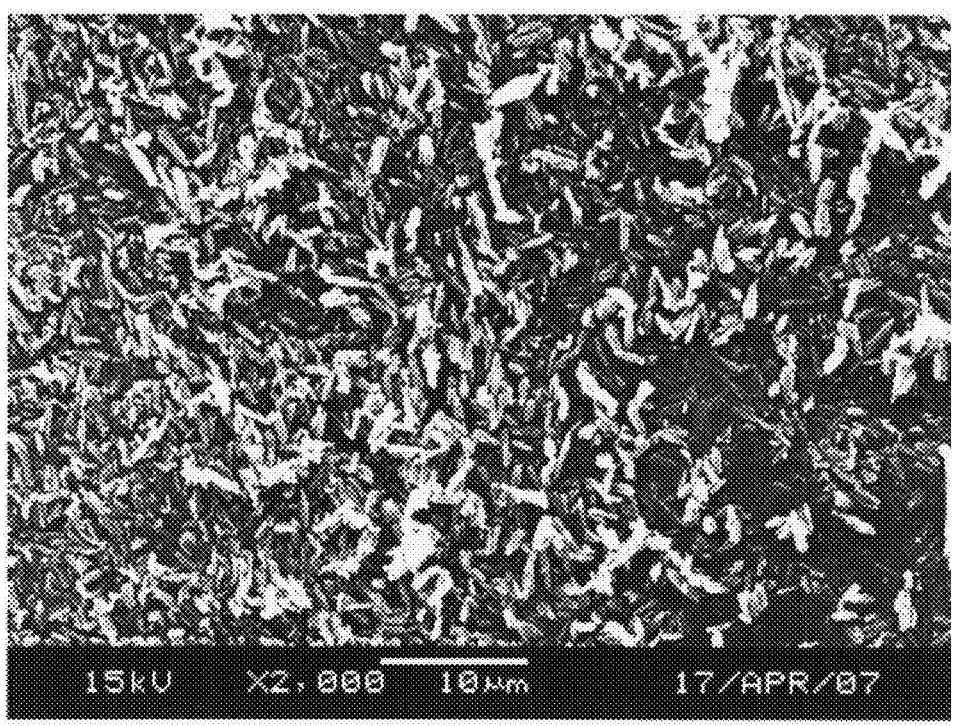
FIG. 15 is an electron microscope photo of a product of Example 9 in accordance with the present invention at magnification of 2000×.
Figure 16:
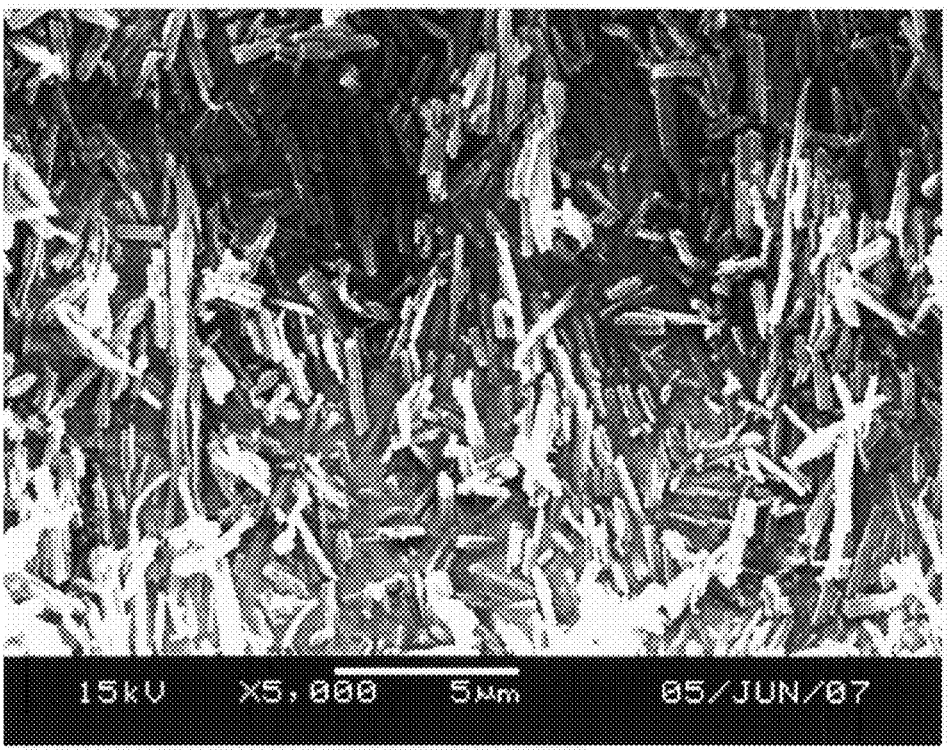
FIG. 16 is an electron microscope photo of the product in FIG. 15 at magnification of 5000×.

A 1000 litter stainless steel reaction tank equipped with a mechanical stirrer and a circulating temperature-controlling jacket was charged with D-sorbitol (40.0 kg, 0.220 kmole), methanesulfonic acid (0.8 kg), 3,4-dimethyl-benzaldehyde (52.5 kg, 0.391 kmole), 3-thiophenecarboxaldehyde (0.440 kg, 0.004 kmole) and methanol (450 kg) to form a reaction mixture. The reaction mixture was stirred at a temperature range of 20~35° C. for 48 hours, neutralized to pH 8~9 with a solution of 4% sodium hydroxide (NaOH) aqueous to form a precipitated product. The precipitated product was collected by filtration, washed with a solution of 40% methanol aqueous, dried with a paddle drying equipment and ground to give modified 1,3:2,4-di(3,4-dimethyl-benzylidene)-D-sorbitol as a fine white powder (68.0 kg, yield 84%) having the following characteristics: a melting point of 257.9° C., a crystallization point of 240.4° C., and an ash content of 0.1%. The prepared powder was observed with an electron microscope at magnifications of 2000× and 5000× as shown in FIGS. 15 and 16.

EXAMPLE 10

Figure 17:
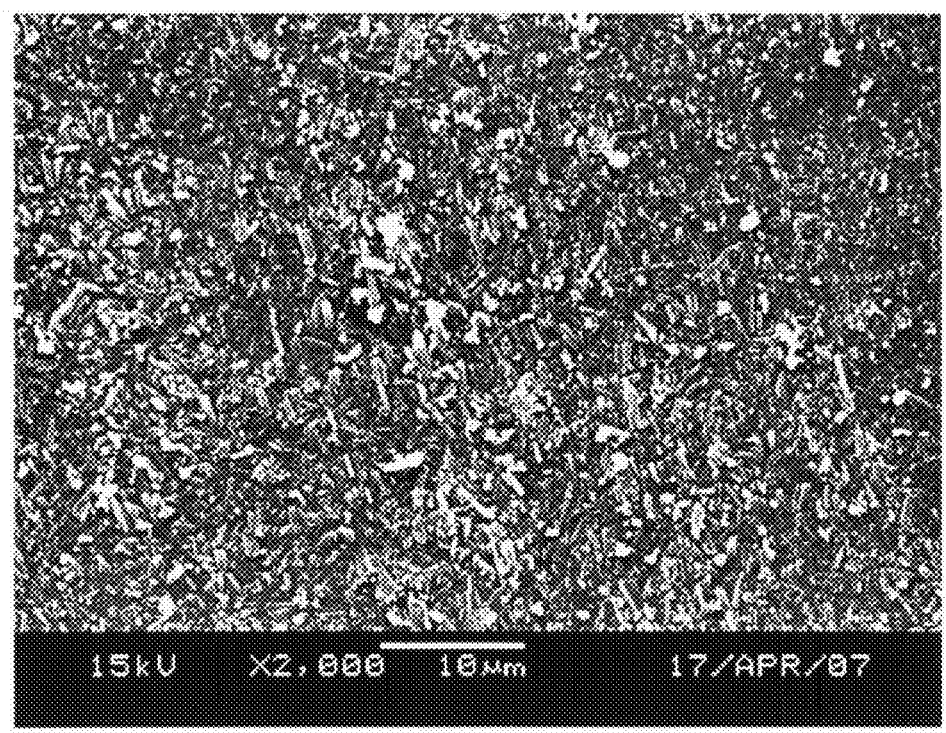
FIG. 17 is an electron microscope photo of a product of Example 10 in accordance with the present invention at magnification of 2000×.
Figure 18:
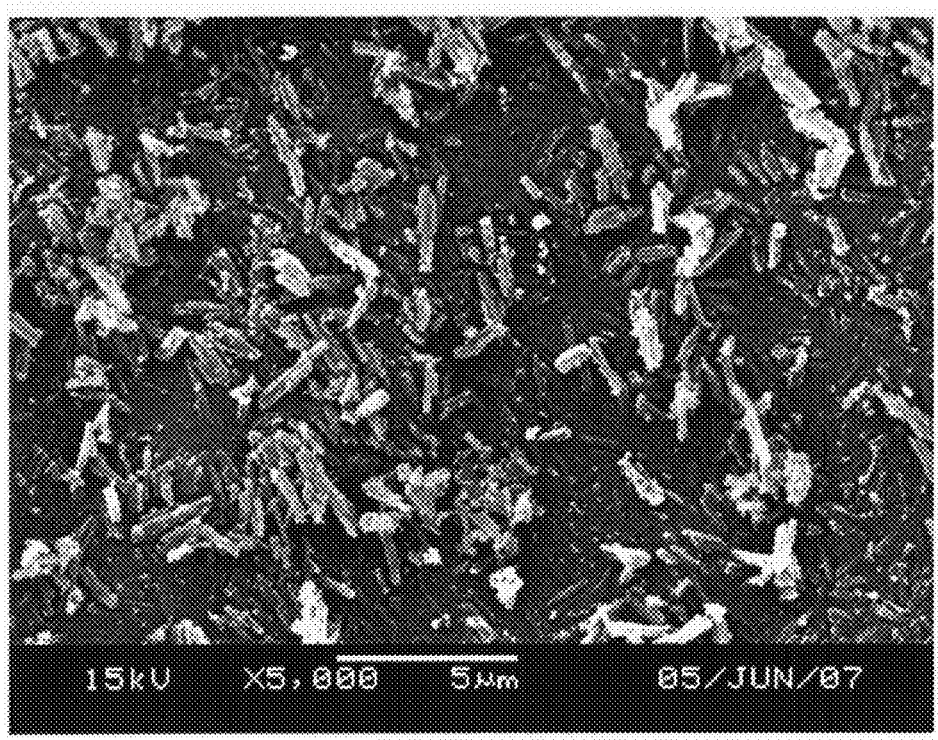
FIG. 18 is an electron microscope photo of the product in FIG. 17 at magnification of 5000×.

Preparation of a Clarifying Agent Composition
Containing Modified
1,3:2,4-di(3,4-dimethyl-benzylidene)-D-sorbitol and
an Organosilane Treated Fume Silica Modified 1,3:2,4-di(3,4-dimethyl-benzylidene)-D-sorbitol was prepared like EXAMPLE 9 to form a reaction mixture and an organosilane treated fume silica (3.0 kg, CAB-O-SIL® TS720) was added to the reaction mixture to form the precipitated product after the reaction mixture was neutralized to pH 8~9. The precipitated product was collected by filtration, washed with a solution of 40% methanol aqueous, dried and ground to give the composition (70.2 kg) having the following characteristics: a melting point of 269.2° C., a crystallization point of 235.0° C., an ash content of 3.2%. The prepared powder was observed with an electron microscope at magnifications of 2000× and 5000× as shown in FIGS. 17 and 18.

EXAMPLE 11

Figure 19:
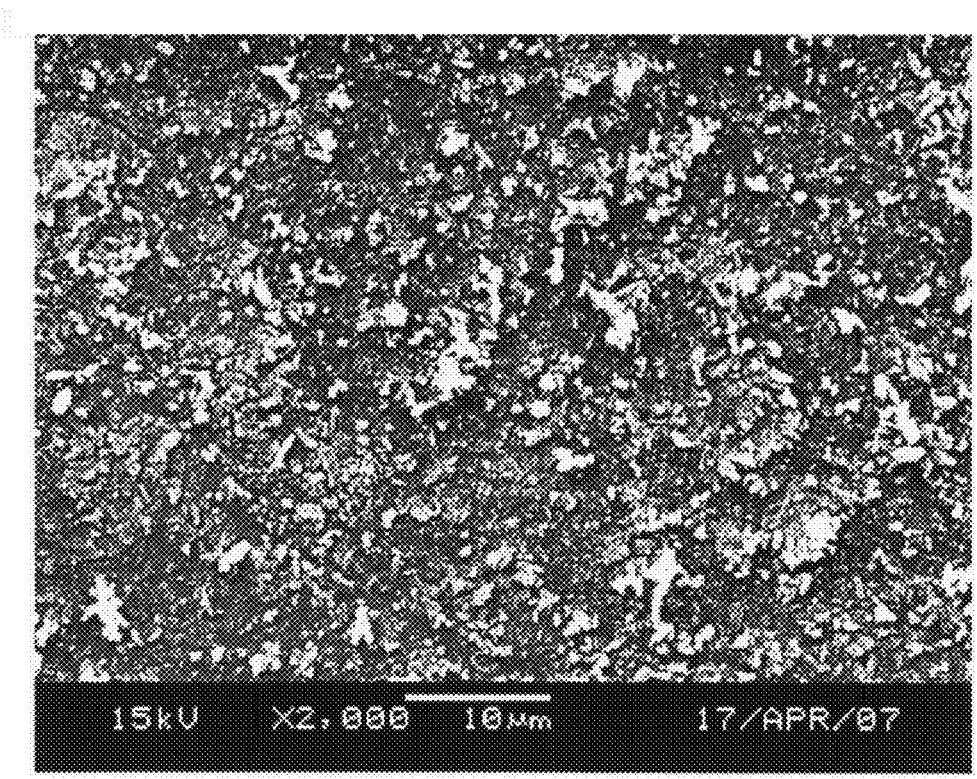
FIG. 19 is an electron microscope photo of a product of Example 11 in accordance with the present invention at magnification of 2000×.
Figure 20:
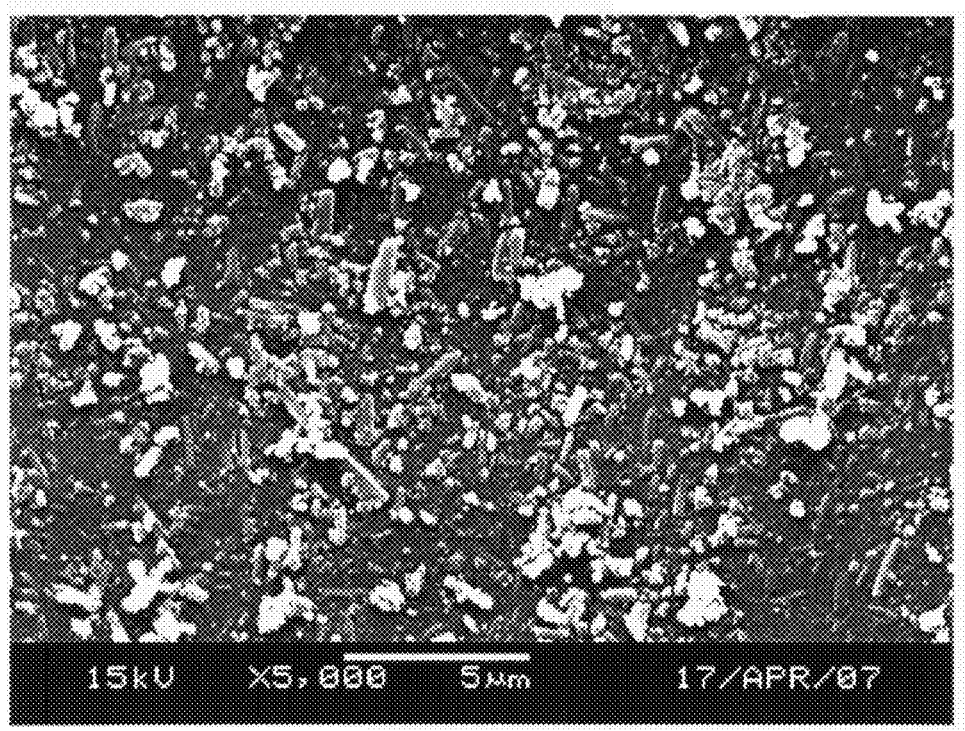
FIG. 20 is an electron microscope photo of the product in FIG. 19 at magnification of 5000×.

Preparation of a Clarifying Agent Composition
Containing Modified
1,3:2,4-di(3,4-dimethyl-benzylidene)-D-sorbitol and
an Organosilane Treated Fume Silica Modified 1,3:2,4-di(4-methyl-benzylidene)-D-sorbitol was prepared like EXAMPLE 9 to form a reaction mixture and an organosilane treated fume silica (7.5 kg, CAB-O-SIL® TS720) was added to the reaction mixture to form the precipitated product after the reaction mixture was neutralized to pH 8~9. The precipitated product was collected by filtration, washed with a solution of 40% methanol aqueous, dried and ground to give the composition (73.7 kg) having an ash content of 9.3%. The prepared powder is observed with an electron microscope at magnifications of 2000× and 5000× as shown in FIGS. 19 and 20.

EXAMPLE 12

Preparation of a Clarifying Agent Composition of
1,3:2,4-di(4-methyl-benzylidene)-D-sorbitol and an
Organosilane Treated Fume Silica A 1000 litter stainless steel reaction tank equipped with a mechanical stirrer and a circulating temperature-controlling jacket was charged with D-sorbitol (40.0 kg, 0.220 kmole), methanesulfonic acid (1.0 kg), 4-methyl-benzaldehyde (47.9 kg, 0.399 kmole) and methanol (500 kg) to form a reaction mixture. The reaction mixture was stirred at a temperature range of 20~35° C. for 48 hours, neutralized to pH 8~9 with a solution of 4% sodium hydroxide (NaOH) aqueous to form a precipitated product. The precipitated product was collected by filtration, washed with a solution of 40% methanol aqueous to give a wet cake (97.4 kg, solid content 71.8%).

Figure 21:
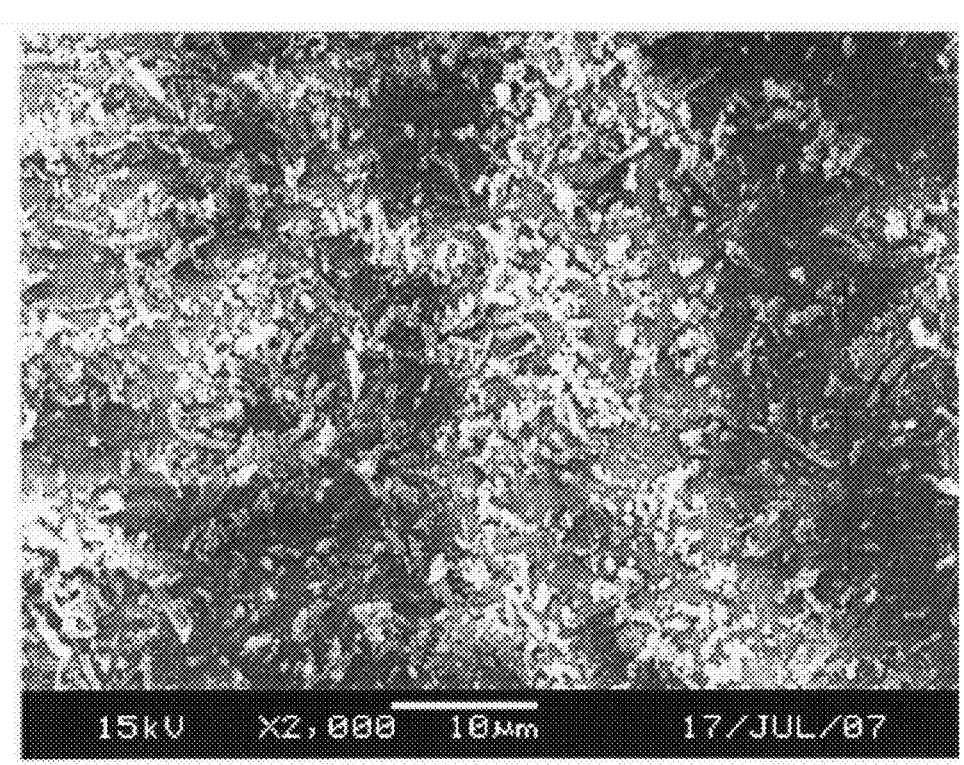
FIG. 21 is an electron microscope photo of a product of Example 12 in accordance with the present invention at magnification of 2000×.
Figure 22:
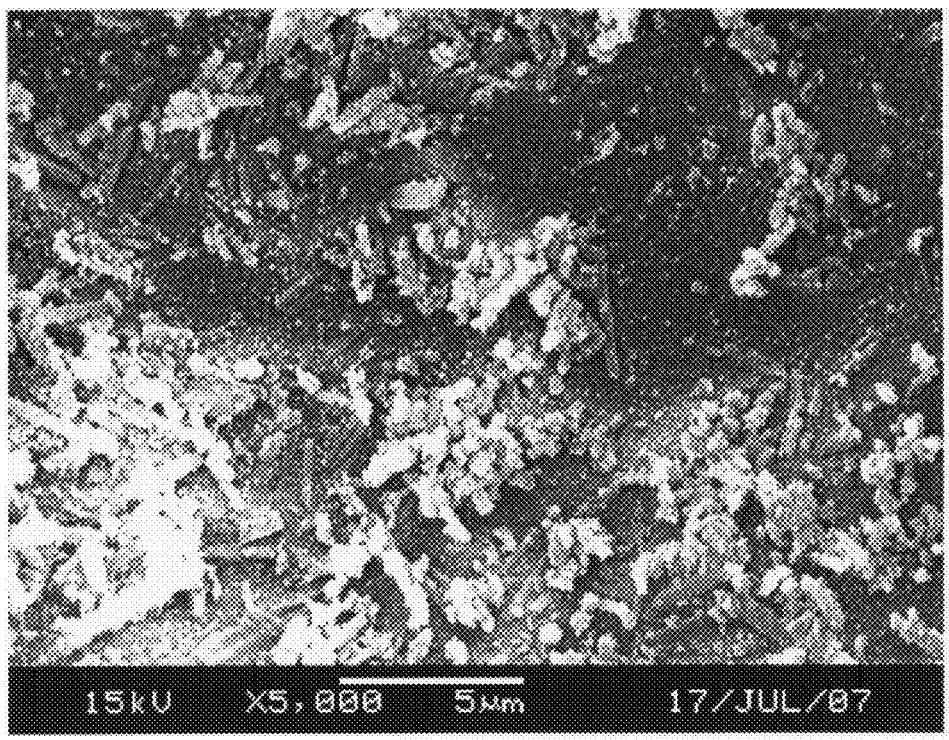
FIG. 22 is an electron microscope photo of the product in FIG. 21 at magnification of 5000×.

The wet cake (sampling 1 kg) was mixed with an organosilane treated fume silica (308 g, CAB-O-SIL® TS720), dried with a paddle drying equipment (10 litter scale) and ground to give a powder of the composition (987 g, ash content 29.2%). The prepared powder was observed with an electron microscope at magnifications of 2000× and 5000× as shown in FIGS. 21 and 22.

EXAMPLE 13

Figure 23:
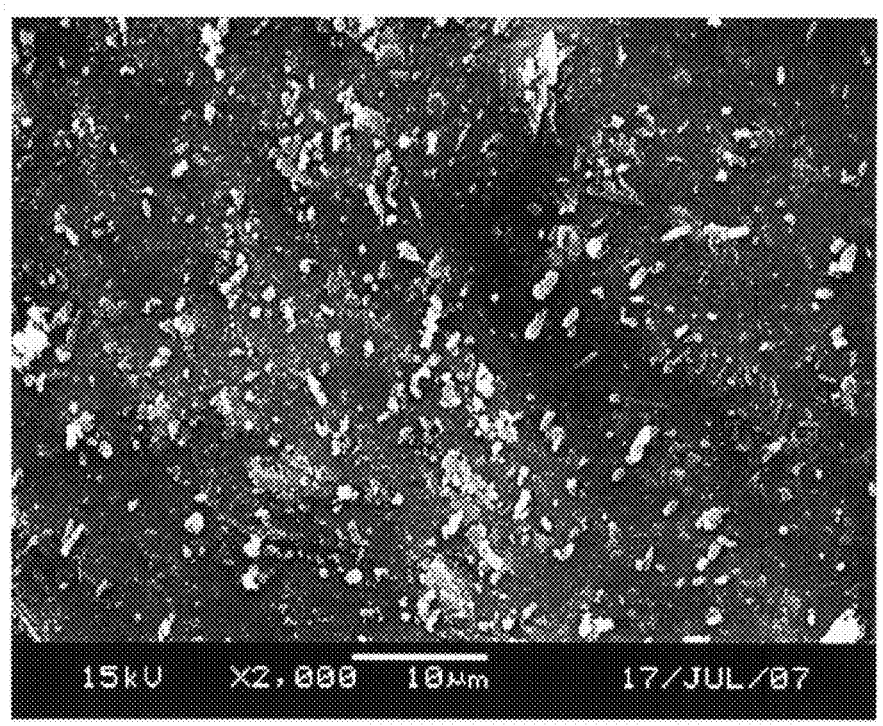
FIG. 23 is an electron microscope photo of a product of Example 13 in accordance with the present invention at magnification of 2000×.
Figure 24:
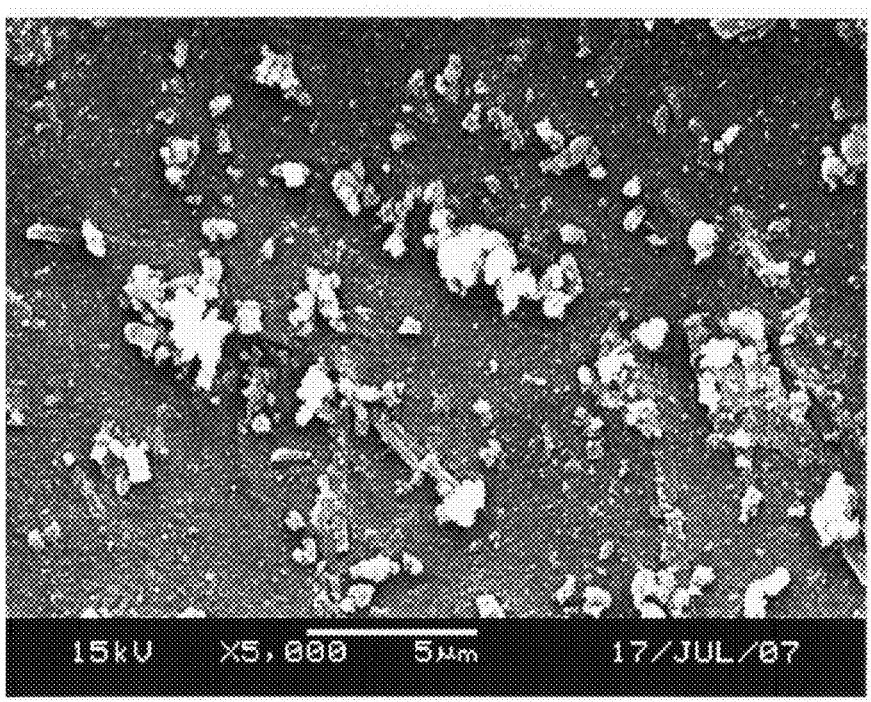
FIG. 24 is an electron microscope photo of the product in FIG. 23 at magnification of 5000×.

Preparation of a Clarifying Agent Composition of
1,3:2,4-di(4-methyl-benzylidene)-D-sorbitol and an
Organosilane Treated Fume Silica The wet cake (sampling 680 g) prepared in EXAMPLE 12 was mixed with an organosilane treated fume silica (500 g, CAB-O-SIL® TS720), dried with a paddle drying equipment (10-L scale) and ground to give a powder of the composition (974 g, ash content 49.7%). The prepared powder was observed with an electron microscope at magnifications of 2000× and 5000× as shown in FIGS. 23 and 24.

The electron microscope photos of FIGS. 1~24 demonstrate that the prepared powders of the clarifying agent compositions become finer when an organosilane treated fume silica having a pH value of 5.5 to 8, measured in a 4% w/w dispersion in 1:1 mixture of water-methanol, is added to the diacetal. Furthermore, the addition of an organosilane treated fume silica substantially prevents the prepared powders of the clarifying agent compositions from aggregating.

EXAMPLE 14

Polyolefin Formation and Testing

The process of adding a clarifier to polyolefin product is well known in the art. Therefore, the present invention only shows components of target polypropylene products and one procedure to prepare the target polypropylene products. The present invention is not intended to be limited to this procedure only, but can be applied to many alternatives in the art.

One-kilogram batches of the target polypropylene were produced in accordance with the following Table 1.

TABLE 1

| Components of the Target Polypropylene | |
|---|---|
| Components | Weight (g) |
| Polypropylene (ST868 or ST611) | 1000 g |
| Irgnox1010, Primary Antioxidant | 1.00 g |
| Irganox168, Secondary Antioxidant | 0.90 g |
| Calcium Stearate, Acid Scavenger | 0.70 g |

TABLE 1-continued

Components of the Target Polypropylene

| Components | Weight (g) |
|---|---|
| Inventive Compositions from Example 1~13 | [2.00/(100% − ash content)] g |

The basic resin and all additives were weighed and then blended. All samples were then melted and compounded in an injector at a ramped temperature from about 180° C. to 240° C. through three heating zones. The melt temperature upon the exit of the injector die was about 220~240° C. The screw of the injector had a length/diameter ratio of 24. Plaques of samples were made through injection into the injection mold. The plaques had a dimension of 142×108×2.54 mm³ and were made in a mold having a mirror finish. The mold cooling air was controlled at a temperature of about 23° C.

The haze values were measured by ASTM Standard Test Method D1003-61 "Standard Test Method for Haze and Luminous Transmittance of Transparent Plastics" using BYK Gardner XL-211 Hazemeter. Visual examinations of the plaques were performed to find as a subjective test of visible white spots in the plaques. Nucleation capabilities were measured as polymer re-crystallization temperatures (Tc), which indicate the rate of polymer formation provided by the presence of the nucleating additive. The Tc of each plaque was determined using a differential scanning calorimeter (Mettler TOLEDO, DSC821e) by first melting the target plaques and then cooling the plaques at a rate of about 10° C./minute. The temperature recorded at which polymer re-formation occurs is equal to Tc. Control plaques were also prepared in the same fashion without the addition of the inventive clarifying agent compositions. Measured results are shown in the following Table 2.

TABLE 2

Results of polypropylene plaques adding the inventive clarifying agent composition from the above Examples.

| Sample | Polypropylene | Haze | Visible white spots | Tc (° C.) |
|---|---|---|---|---|
| Control plaque 1 | ST868 | 78.7 | Nil | 101.8 |
| Millad ® 3988* | ST868 | 24.3 | Few | 119.3 |
| EXAMPLE 1 | ST868 | 61.4 | Obvious | 113.2 |
| EXAMPLE 2 | ST868 | 52.3 | Nil | 114.5 |
| EXAMPLE 3 | ST868 | 31.3 | Few | 119.4 |
| EXAMPLE 4 | ST868 | 24.1 | Nil | 119.1 |
| EXAMPLE 5 | ST868 | 74.1 | Few | 102.2 |
| Control plaque 2 | ST611 | 78.4 | Nil | 100.0 |
| EXAMPLE 6 | ST611 | 25.3 | Few | 118.2 |
| EXAMPLE 7 | ST611 | 23.2 | Nil | 118.5 |
| EXAMPLE 8 | ST611 | 22.7 | Nil | 117.3 |
| EXAMPLE 9 | ST611 | 24.6 | Few | 118.5 |
| EXAMPLE 10 | ST611 | 24.4 | Nil | 118.9 |
| EXAMPLE 11 | ST611 | 24.1 | Nil | 118.9 |
| EXAMPLE 12 | ST611 | 23.4 | Nil | 118.1 |
| EXAMPLE 13 | ST611 | 23.9 | Nil | 118.2 |

Above results of polypropylene plaques show that the polypropylene plaques containing the inventive clarifying agent compositions (Example 2, 4, 7, 8, 10, 11, 12, 13) have no visible white spots and indicate that the addition of the inventive clarifying agent compositions prevents the formation of visible white spots. Hence, the polypropylene plaques with the inventive clarifying agent compositions have a better appearance than the polypropylene plaques without the inventive clarifying agent compositions.

In addition, the manufacturing method in accordance with the present invention compared with the conventional diacetal manufacturing methods has the following advantages: 1. no triacetal production; 2. effective removal of monoacetal; 3. ease of production; 4. controllable powder size; and 5. high dispersal of the clarifying composition.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A clarifying agent composition comprising a diacetal powder and the diacetal having the general structure formula (I), (II), (III), (IV) or (V),

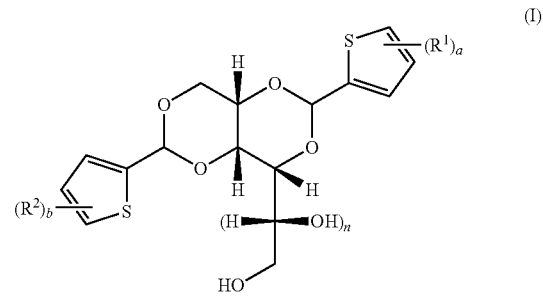

(I)

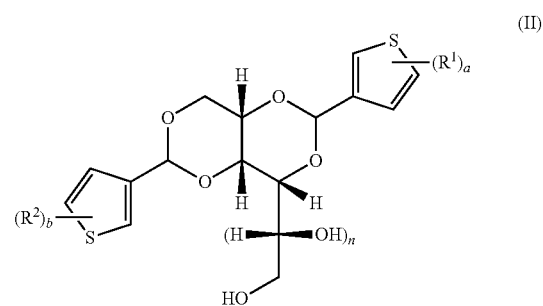

(II)

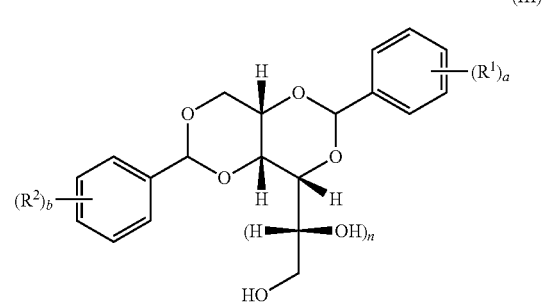

(III)

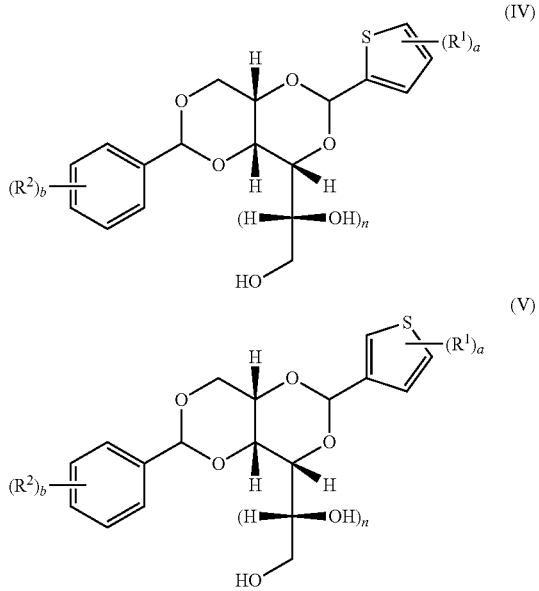

wherein R¹ and R² are independently selected from the group consisting of H, $C_1$-$C_4$ alkyl, $C_1$-$C_4$ carbalkoxy, F, Cl, and Br; a is 0, 1, 2 or 3; b is 0, 1, 2 or 3 and n is 0 or 1; and an organosilane treated fume silica having a pH value of 5.5 to 8, measured in a 4% w/w dispersion in 1:1 mixture of water-methanol, being dispersed in the diacetal powder and being 0.05~50% by weight of the weight of the clarifying agent composition.

2. The clarifying agent composition as claimed in claim 1, wherein the diacetal is 1,3:2,4-di(3-thenylidene)-D-sorbitol, 1,3:2,4-di(5-methyl-2-thenylidene)-D-sorbitol, 1,3:2,4-di(4-methyl-benzylidene)-D-sorbitol, 1,3:2,4-di(3,4-dimethyl-benzylidene)-D-sorbitol, 1,3-(3-thenylidene)-2,4-(4-methyl-benzylidene)-D-sorbitol, 1,3-(3-thenylidene)-2,4-(3,4-dimethyl-benzylidene)-D-sorbitol, 1,3-(5-methyl-2-thenylidene)-2,4-(4-methyl-benzylidene)-D-sorbitol or 1,3-(5-methyl-2-thenylidene)-2,4-(3,4-dimethyl-benzylidene)-D-sorbitol.

3. The clarifying agent composition as claimed in claim 2, wherein the organosilane treated fume silica is obtained by a treatment with trimethylchlorosilane.

4. A polyolefin composition characterized in that the clarifying agent composition as claimed in claim 1 is added during the polymerization of the polyolefin.

5. The polyolefin composition as claimed in claim 4 characterized in that the clarifying agent composition comprising 1,3:2,4-di(3-thenylidene)-D-sorbitol, 1,3:2,4-di(5-methyl-2-thenylidene)-D-sorbitol, 1,3:2,4-di(4-methyl-benzylidene)-D-sorbitol, 1,3:2,4-di(3,4-dimethyl-benzylidene)-D-sorbitol, 1,3-(3-thenylidene)-2,4-(4-methyl-benzylidene)-D-sorbitol, 1,3-(3-thenylidene)-2,4-(3,4-dimethyl-benzylidene)-D-sorbitol, 1,3-(5-methyl-2-thenylidene)-2,4-(4-methyl-benzylidene)-D-sorbitol or 1,3-(5-methyl-2-thenylidene)-2,4-(3,4-dimethyl-benzylidene)-D-sorbitol is added during the polymerization of the polyolefin.

6. The polyolefin composition as claimed in claim 5 characterized in that the clarifying agent composition comprising the organosilane treated fume silica obtained by a treatment with hexamethyldisilazane, trimethylchlorosilane or polydimethylsiloxane is added during the polymerization of the polyolefin.

7. A transparent polyolefin plastic article comprising the polyolefin composition as claimed in claim 4.

8. The transparent polyolefin plastic article as claimed in claim 7 comprising the polyolefin composition containing the clarifying agent composition comprising 1,3:2,4-di(3-thenylidene)-D-sorbitol, 1,3:2,4-di(5-methyl-2-thenylidene)-D-sorbitol, 1,3:2,4-di(4-methyl-benzylidene)-D-sorbitol, 1,3:2,4-di(3,4-dimethyl-benzylidene)-D-sorbitol, 1,3-(3-thenylidene)-2,4-(4-methyl-benzylidene)-D-sorbitol, 1,3-(3-thenylidene)-2,4-(3,4-dimethyl-benzylidene)-D-sorbitol, 1,3-(5-methyl-2-thenylidene)-2,4-(4-methyl-benzylidene)-D-sorbitol or 1,3-(5-methyl-2-thenylidene)-2,4-(3,4-dimethyl-benzylidene)-D-sorbitol is added during the polymerization of the polyolefin.

9. The transparent polyolefin plastic article as claimed in claim 8 comprising the polyolefin composition containing the clarifying agent composition comprising the organosilane treated fume silica obtained by a treatment with hexamethyldisilazane, trimethylchlorosilane or polydimethylsiloxane.

* * * * *